United States Patent
Glickman et al.

(10) Patent No.: US 11,947,011 B2
(45) Date of Patent: Apr. 2, 2024

(54) SENSOR APPARATUS WITH CLEANING

(71) Applicant: Ford Global Technologies, LLC, Dearborn, MI (US)

(72) Inventors: David Brian Glickman, Southfield, MI (US); Venkatesh Krishnan, Canton, MI (US); Darshan Arun Nayak, Northville, MI (US); Kunal Singh, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 885 days.

(21) Appl. No.: 17/007,282

(22) Filed: Aug. 31, 2020

(65) Prior Publication Data

US 2022/0066032 A1 Mar. 3, 2022

(51) Int. Cl.
| | |
|---|---|
| *G01S 7/10* | (2006.01) |
| *B08B 3/04* | (2006.01) |
| *B08B 13/00* | (2006.01) |
| *B60S 1/50* | (2006.01) |
| *B60S 1/52* | (2006.01) |
| *G01S 7/481* | (2006.01) |
| *G01S 17/10* | (2020.01) |
| *G01S 17/931* | (2020.01) |
| *B60W 60/00* | (2020.01) |

(52) U.S. Cl.
CPC ............... *G01S 17/10* (2013.01); *B08B 3/04* (2013.01); *B08B 13/00* (2013.01); *B60S 1/50* (2013.01); *B60S 1/52* (2013.01); *G01S 7/4813* (2013.01); *G01S 17/931* (2020.01); *B60W 60/001* (2020.02); *B60W 2420/42* (2013.01); *B60W 2420/52* (2013.01); *B60W 2420/62* (2013.01)

(58) Field of Classification Search
CPC ..... B08B 3/02; B08B 5/02; B60S 1/56; B60S 1/00; B60S 1/46; B60S 1/54; G02B 27/0006; B05B 1/185
See application file for complete search history.

(56) References Cited

U.S. PATENT DOCUMENTS

| | | | |
|---|---|---|---|
| 9,625,714 B2 | 4/2017 | Rousseau | |
| 10,232,828 B2 | 3/2019 | Ekola et al. | |
| 2018/0134258 A1* | 5/2018 | Ekola | B60S 1/52 |
| 2019/0184942 A1 | 6/2019 | Vaishnav et al. | |
| 2019/0232315 A1 | 8/2019 | Mousavi Ehteshami et al. | |
| 2019/0314865 A1 | 10/2019 | Sevak et al. | |
| 2020/0061643 A1* | 2/2020 | Rachow | B05B 1/14 |

* cited by examiner

*Primary Examiner* — Qingzhang Zhou
(74) *Attorney, Agent, or Firm* — Frank A. MacKenzie; Bejin Bieneman PLC (57) ABSTRACT

A sensor apparatus includes a cylindrical sensor window defining an axis and a ring fixed relative to the sensor window and centered around the axis. The ring includes a liquid chamber, at least one nozzle, and an air chamber. The liquid chamber is elongated circumferentially around the axis. The at least one nozzle is fluidly connected to the liquid chamber and has a direction of discharge aimed at the sensor window. The air chamber is elongated circumferentially around the axis alongside the liquid chamber. The air chamber lacks inlets and outlets.

20 Claims, 5 Drawing Sheets

SENSOR APPARATUS WITH CLEANING

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

A sensor apparatus includes a cylindrical sensor window defining an axis; and a ring fixed relative to the sensor window and centered around the axis. The ring includes a liquid chamber, at least one nozzle, and an air chamber. The liquid chamber is elongated circumferentially around the axis. The at least one nozzle is fluidly connected to the liquid chamber and has a direction of discharge aimed at the sensor window. The air chamber is elongated circumferentially around the axis alongside the liquid chamber. The air chamber lacks inlets and outlets.

The liquid chamber may be one of a plurality of liquid chambers each elongated circumferentially around the axis, the air chamber may be one of a plurality of air chambers each elongated circumferentially around the axis alongside one of the liquid chambers, and each air chamber may lack inlets and outlets. The ring may include a plurality of nozzles including the at least one nozzle, and each nozzle may be fluidly connected to one of the liquid chambers and may have a direction of discharge aimed at the sensor window. The nozzles may include at least one first nozzle and at least one second nozzle; the first nozzles may each have a direction of discharge in a radially inward and axial direction forming a first angle with the axis; and the second nozzles may each have a direction of discharge in a radially inward and axial direction forming a second angle with the axis, the second angle being different than the first angle. The plurality of nozzles may include at least two first nozzles and at least two second nozzles, and the first nozzles and second nozzles may be arranged in an alternating pattern around the ring. The nozzles may be arranged in pairs of one first nozzle and one second nozzle, and each first nozzle may be closer to the second nozzle in the pair than to any other second nozzles. The ring may consist of a plurality of insert pieces and a body piece, each insert piece may include one of the pairs of nozzles, and the body piece may be a single piece.

The first and second nozzles may each include a flat deflection surface and an outlet directed at the respective deflection surface. The deflection surfaces of the first nozzles may each define the first angle with the axis, and the deflection surfaces of the second nozzles may each define the second angle with the axis.

Each liquid chamber is fluidly isolated from the other liquid chambers.

The ring may include a wall elongated circumferentially, the wall may partially form the liquid chamber and may partially form the air chamber.

The air chamber may be disposed radially outside the liquid chamber relative to the axis. The air chamber may be a first air chamber, the ring may include a second air chamber elongated circumferentially around the axis alongside the liquid chamber, the second air chamber may lack inlets and outlets, and the second air chamber may be disposed radially inside the liquid chamber relative to the axis. The axis may extend vertically, the nozzles may be positioned on top of the liquid chamber, and the first air chamber and second air chamber may be open in a downward direction.

The air chamber may be disposed below the liquid chamber and radially inside the liquid chamber relative to the axis. The liquid chamber may be elongated from a first end to a second end, and the air chamber may have a U-shaped cross-section extending from the first end to the second end of the liquid chamber.

The sensor apparatus may further include a housing to which the sensor window and the ring are mounted. The sensor window may extend above the housing, and the direction of discharge of the at least one nozzle may be aimed outside the housing.

With reference to the Figures, a sensor apparatus 32 of a vehicle 30 includes a cylindrical sensor window 34 defining an axis A and a ring 36 fixed relative to the sensor window 34 and centered around the axis A. The ring 36 includes at least one liquid chamber 38, at least one nozzle 40, 42, and at least one air chamber 44. Each liquid chamber 38 is elongated circumferentially around the axis A. The at least one nozzle 40, 42 is fluidly connected to one of the liquid chambers 38 and has a direction of discharge aimed at the sensor window 34. Each air chamber 44 is elongated circumferentially around the axis A alongside one of the liquid chambers 38. The air chambers 44 lack inlets and outlets.

The air chambers 44 provide insulation for the liquid chambers 38. The position of the air chambers 44 can prevent liquid in the liquid chambers 38 from freezing, permitting the sensor apparatus 32 to more reliably wash the sensor window 34. A sensor 46 including the sensor window 34 can thus generate more accurate data by staying clean even in cold weather.

Figure 1:
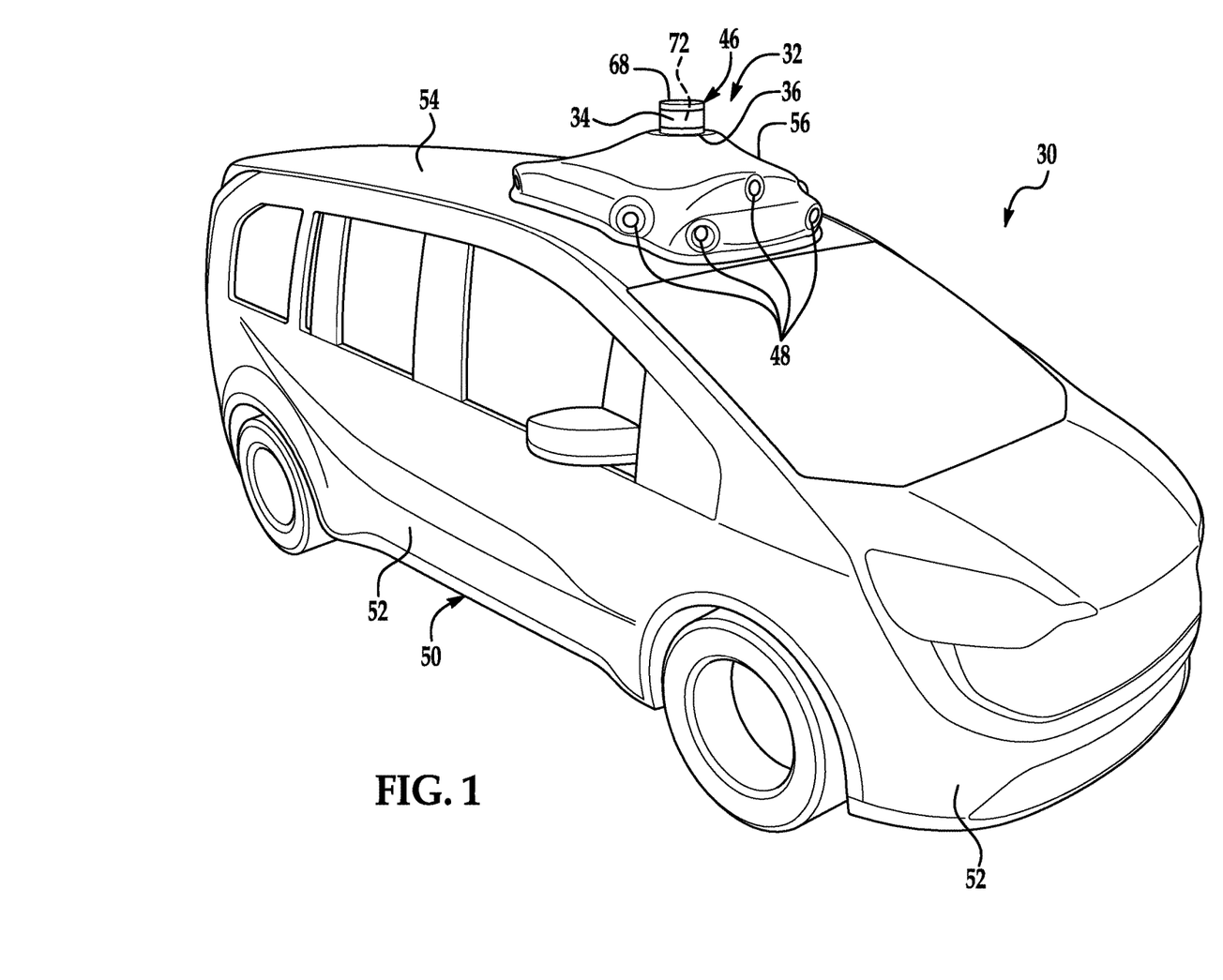
FIG. 1 is a perspective view of an example vehicle including a sensor apparatus.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate a propulsion, brake system, steering, and/or other vehicle systems based at least in part on data received from the sensor 46 described below, as well as other sensors 48. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 50. The vehicle 30 may be of a unibody construction, in which a frame and the body 50 of the vehicle 30 are a single component. The vehicle 30 may, alternatively, be of a body-on-frame construction, in which the frame supports the body 50 that is a separate component from the frame. The frame and body 50 may be formed of any suitable materials, for example, steel, aluminum, etc.

The body 50 includes body panels 52 partially defining an exterior of the vehicle 30. The body panels 52 may present a class-A surface, e.g., a finished surface exposed to view by a customer and free of unaesthetic blemishes and defects. The body panels 52 include, e.g., a roof 54, etc.

The sensor apparatus 32 includes a housing 56 for the sensor 46 and the other sensors 48. The housing 56 is attachable to the vehicle 30, e.g., to one of the body panels 52 of the vehicle 30, e.g., the roof 54. For example, the housing 56 may be shaped to be attachable to the roof 54, e.g., may have a shape matching a contour of the roof 54. The housing 56 may be attached to the roof 54, which can provide the sensor 46 and the other sensors 48 with an unobstructed field of view of an area around the vehicle 30. The housing 56 may be formed of, e.g., plastic or metal.

Figure 2:
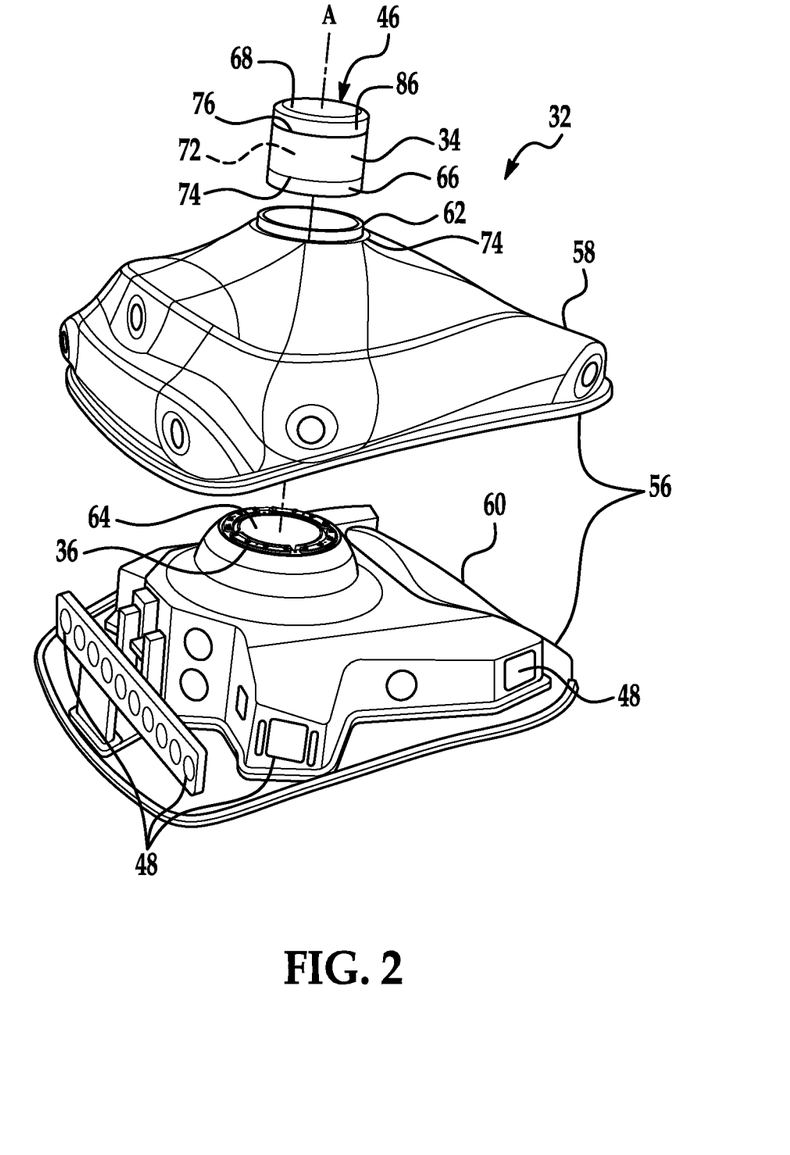
FIG. 2 is an exploded perspective view of a portion of the sensor apparatus.

With reference to FIG. 2, the housing 56 includes a housing upper part 58 and a housing lower part 60. The housing upper part 58 and the housing lower part 60 are shaped to fit together, with the housing upper part 58 fitting on top of the housing lower part 60. The housing upper part 58 covers the housing lower part 60. The housing upper part 58 includes a central opening 62 that exposes the housing lower part 60. The central opening 62 is round, e.g., has a circular or slightly elliptical shape.

The housing lower part 60 includes a bracket 64 to which a sensor-housing bottom 66 of a sensor housing 68 of the sensor 46 is mounted. The sensor housing 68 is supported by and mounted to the housing 56, specifically the housing lower part 60. The sensor housing 68 can be disposed on top of the housing 56 at a highest point of the housing 56. The bracket 64 is shaped to accept and fix in place the sensor-housing bottom 66 of the sensor housing 68, e.g., with a press fit or snap fit. The bracket 64 defines an orientation and position of the sensor housing 68 relative to the body 50 of the vehicle 30. The sensor housing 68 fits through the central opening 62 of the housing upper part 58.

The sensor apparatus 32 includes the sensor 46. The sensor 46 includes the sensor housing 68. The sensor housing 68 has a cylindrical shape and defines the axis A. The sensor housing 68 extends vertically upward along the axis A from the sensor-housing bottom 66. The sensor-housing bottom 66 is mounted on the housing 56 and extends upward from the housing 56. The sensor housing 68 includes a sensor-housing top 70, the sensor window 34, and the sensor-housing bottom 66. The sensor-housing top 70 is disposed directly above the sensor window 34, and the sensor-housing bottom 66 is disposed directly below the sensor window 34. The sensor-housing top 70 and the sensor-housing bottom 66 are vertically spaced apart by a height of the sensor window 34.

The sensor 46 includes a sensing device 72 disposed inside the sensor housing 68. The sensing device 72 is attached to and supported by the sensor housing 68. The sensing device 72 forms the operational components of the sensor 46. The sensing device 72 may be designed to detect features of the outside world; for example, the sensor 46 may be a radar sensor, a scanning laser range finder, a light detection and ranging (LIDAR) device, or an image processing sensor such as a camera. In particular, the sensor 46 may be a LIDAR device, e.g., a scanning LIDAR device. A LIDAR device, here the sensing device 72, detects distances to objects by emitting laser pulses at a particular wavelength and measuring the time of flight for the pulse to travel to the object and back.

The sensor window 34 is cylindrical and defines the axis A, which is oriented vertically. The sensor window 34 extends around the axis A. The sensor window 34 can extend fully around the axis A, i.e., 360°, or partially around the axis A. The sensor window 34 extends along the axis A from a bottom edge 74 to a top edge 76. The bottom edge 74 contacts the sensor-housing bottom 66, and the top edge 76 contacts the sensor-housing top 70. The sensor window 34 is positioned above the ring 36, i.e., the bottom edge 74 of the sensor window 34 is above the ring 36. The sensor window 34 is positioned above the housing 56, i.e., the bottom edge 74 of the sensor window 34 is above the housing 56. The outer diameter of the sensor window 34 may be the same as the outer diameters of the sensor-housing top 70 and/or the sensor-housing bottom 66; in other words, the sensor window 34 may be flush or substantially flush with the sensor-housing top 70 and/or the sensor-housing bottom 66. "Substantially flush" means a seam between the sensor window 34 and the sensor-housing top 70 or sensor-housing bottom 66 does not cause turbulence in air flowing along the sensor window 34. At least some of the sensor window 34 is transparent with respect to whatever medium the sensing device 72 is capable of detecting. For example, if the sensor 46 is a LIDAR device using wavelengths in the visible spectrum, then the sensor window 34 is transparent with respect to visible light (i.e., visible light can pass through the sensor window 34) at the wavelengths generated by the sensing device 72.

The ring 36 is fixed relative to the sensor window 34. For example, the ring 36 can be mounted to the housing 56, e.g., bolted to the housing lower part 60, to which the sensor housing 68 including the sensor window 34 is mounted. The ring 36 is elongated along a circle centered on the axis A, i.e., is elongated circumferentially around the axis A at a substantially constant radius from the axis A.

Figure 3:
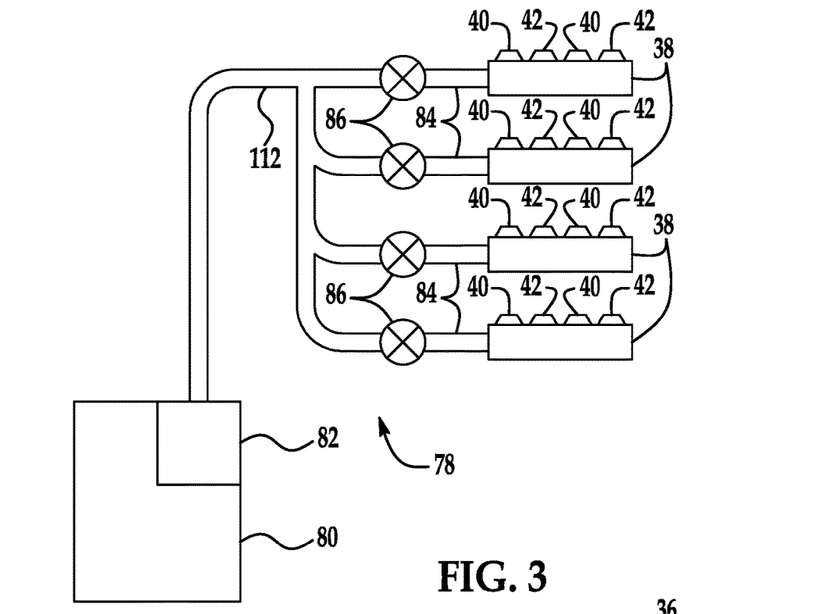
FIG. 3 is a diagram of an example liquid-cleaning system of the vehicle.

With reference to FIG. 3, a liquid cleaning system 78 of the vehicle 30 includes a reservoir 80, a pump 82, liquid supply lines 84, valves 86, the liquid chambers 38, and the nozzles 40, 42. The nozzles 40, 42 include first nozzles 40 and second nozzles 42. The reservoir 80 and the pump 82 are fluidly connected (i.e., fluid can flow from one to the other) to each valve 86, to each liquid chamber 38, and thus to the first nozzles 40 and second nozzles 42. The liquid cleaning system 78 distributes washer fluid stored in the reservoir 80 to the first nozzles 40 and second nozzles 42. "Washer fluid" is any liquid stored in the reservoir 80 for cleaning. The washer fluid may include solvents, detergents, diluents such as water, etc.

The reservoir 80 may be a tank fillable with liquid, e.g., washer fluid for window cleaning. The reservoir 80 may be disposed in a front end of the vehicle 30, specifically, in an engine compartment forward of a passenger cabin. Alternatively, the reservoir 80 may be disposed in the housing 56. The reservoir 80 may store the washer fluid only for supplying the sensor 46 and the other sensors 48, or also for other purposes, such as supply to a windshield.

The pump 82 forces the washer fluid through the liquid supply lines 84 to the valves 86 and then to the first nozzles 40 and second nozzles 42 with sufficient pressure that the washer fluid sprays from the first nozzles 40 and second nozzles 42. The pump 82 is fluidly connected to the reservoir 80. The pump 82 may be attached to or disposed in the reservoir 80.

The liquid supply lines 84 can extend from the pump 82 to the valves 86, and from the valves 86 to the liquid chambers 38. A separate liquid supply line 84 extends from each valve 86 to the respective liquid chamber 38. The liquid supply lines 84 may be, e.g., flexible tubes.

The valves 86 are actuatable independently of one another to open and close, to permit the washer fluid to flow through or to block the washer fluid; i.e., each valve 86 can be opened or closed without changing the status of the other valves 86. Each valve 86 is positioned to permit or block flow from the reservoir 80 to a respective one of the liquid chambers 38. The valves 86 may be any suitable type of valve, e.g., ball valve, butterfly valve, choke valve, gate valve, globe valve, etc.

With reference to FIGS. 4-7, the ring 36 includes a plurality of the liquid chambers 38, e.g., four liquid chambers 38. Each liquid chamber 38 is elongated along an arc of circle centered on the axis A, i.e., circumferentially around the axis A at a substantially constant radius from the axis A. Each liquid chamber 38 is elongated circumferentially from a first end 88 to a second end 90. Each liquid chamber 38 can have substantially the same circumferential elongation around the axis A, e.g., 90°. The liquid chambers 38 collectively form the ring 36 substantially centered around the axis A. The circumferential elongation of the liquid chambers 38 can sum to 360°, e.g., four liquid chambers 38 of 90°, or can sum to less than 360° by having gaps circumferentially between the liquid chambers 38, as shown in the Figures.

Each liquid chamber 38 is formed of a plurality of walls 92, 94, 96, 98, 100. The walls 92, 94, 96, 98, 100 for each liquid chamber 38 include end walls 92 at the first end 88 and second end 90 of the liquid chamber 38, as well as a radially outer side wall 94, a floor 96, a radially inner side wall 98, and a ceiling 100 elongated circumferentially from one of the end walls 92 to the other of the end walls 92. Each liquid chamber 38 has a substantially constant cross-section along the arc of circle extending circumferentially around the axis A from one of the end walls 92 to the other of the end walls 92. The cross-section of each liquid chamber 38 includes the radially outer side wall 94, the floor 96, the radially inner side wall 98, and the ceiling 100. The floor 96 extends horizontally, the radially outer side wall 94 extends vertically from a radially outer edge of the floor 96 to a radially outer edge of the ceiling 100, the radially inner side wall 98 extends vertically from a radially inner edge of the floor 96 to a radially inner edge of the ceiling 100, and the ceiling 100 extends horizontally radially outward from the radially inner side wall 98 to the radially outer side wall 94.

Each liquid chamber 38 is fluidly isolated from the other liquid chambers 38. In other words, the liquid chambers 38 are arranged such that fluid cannot flow from inside one to inside the other. The liquid chambers 38 are sealed other than the first nozzles 40, the second nozzles 42, and inlets 102. Having multiple separate liquid chambers 38 can permit isolated cleaning of just a portion of the sensor window 34 and can make the pressure requirements for the cleaning more manageable than the ring 36 including a single liquid chamber. Separating the fluid flow into the ring 36 into the separate liquid chambers 38 can help equalize the velocity of fluid leaving the nozzles 40, 42.

Each liquid chamber 38 includes one inlet 102 fluidly connected to the respective liquid chamber 38. The reservoir 80 is fluidly coupled to each liquid chamber 38 via the respective inlet 102. The inlets 102 extend downwardly from the respective floors 96. Each inlet 102 may be disposed approximately halfway along the circumferential elongation of the respective liquid chamber 38; e.g., if the liquid chamber 38 has a circumferential elongation of 90°, the inlet 102 is approximately 45° from either end 88, 90 of the liquid chamber 38.

Figure 4:
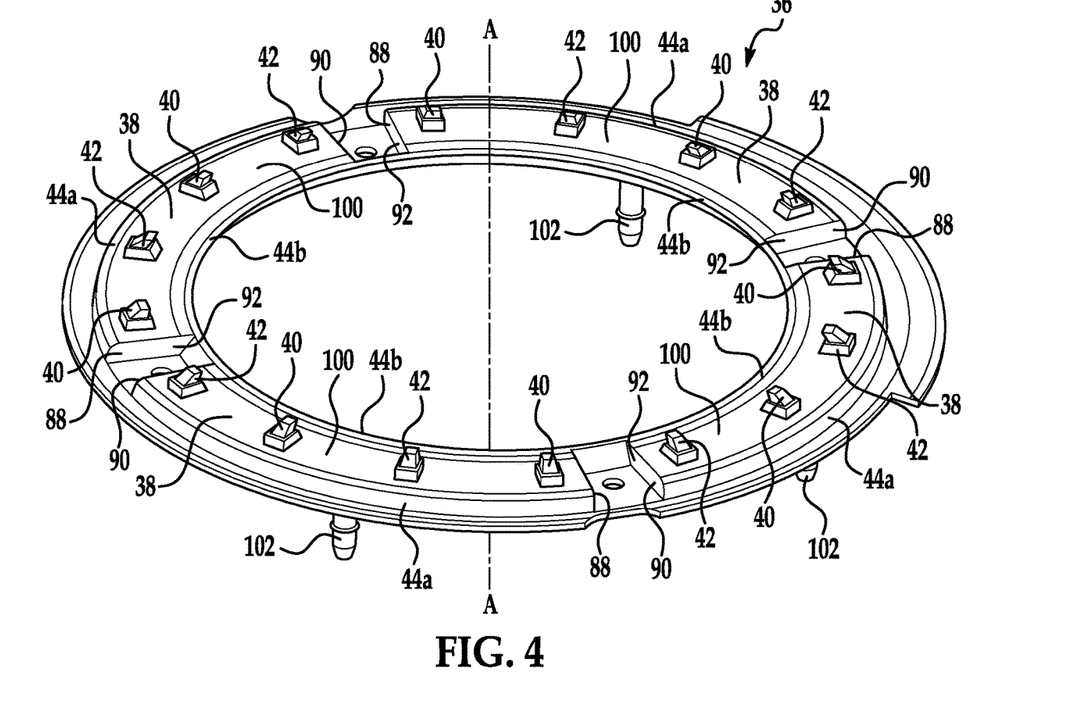
FIG. 4 is a perspective view of an example ring of the sensor apparatus.
Figure 6:
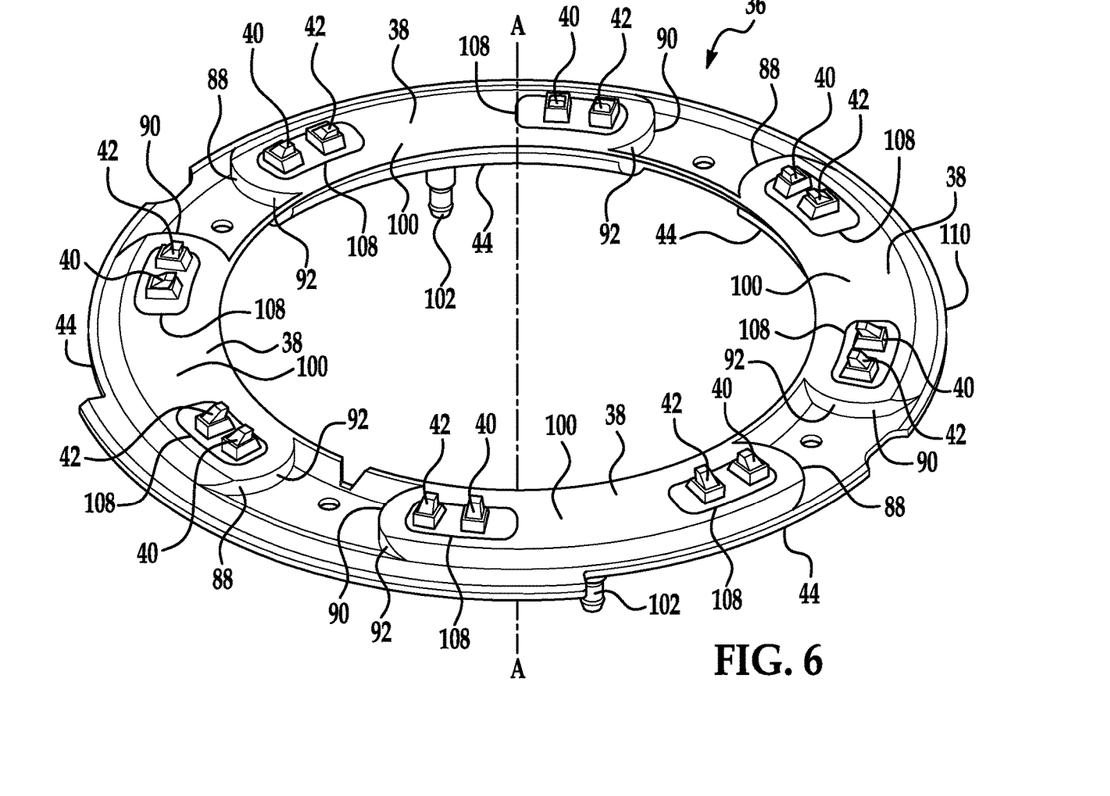
FIG. 6 is a perspective view of another example ring of the sensor apparatus.

With reference to FIGS. 4 and 6, each liquid chamber 38 includes at least one first nozzle 40 and at least one second nozzle 42 positioned on top of a respective liquid chamber 38 and fluidly connected to the respective liquid chamber 38. The nozzles 40, 42 extend through the respective ceiling 100. The first nozzles 40 and the second nozzles 42 are arranged in an alternating pattern around the ring 36; i.e., each first nozzle 40 is circumferentially adjacent to one second nozzle 42 in each direction, and each second nozzle 42 is circumferentially adjacent to one first nozzle 40 in each direction. The first nozzles 40 can include eight first nozzles 40, and the second nozzles 42 can include eight second nozzles 42. The first nozzles 40 and the second nozzles 42 can be evenly divided among the liquid chambers 38; e.g., for four liquid chambers 38, each liquid chamber 38 includes two first nozzles 40 and two second nozzles 42. The alternating pattern of first and second nozzles 40, 42 provides even circumferential coverage of both upper and lower sections of the sensor window 34 (as described below, the first nozzles 40 and the second nozzles 42 are aimed at different vertical portions of the sensor window 34).

With reference to FIG. 4, in a first example of the ring 36, the first nozzles 40 and second nozzles 42 are substantially evenly spaced around the ring 36; i.e., the distance from each first or second nozzle 40, 42 to the adjacent first or second nozzle 40, 42 is substantially the same.

With reference to FIG. 6, in a second example of the ring 36, the nozzles 40, 42 are arranged in pairs of one first nozzle 40 and one second nozzle 42. Each first nozzle 40 is closer to the second nozzle 42 in the pair with that first nozzle 40 than to any other second nozzles 42. Each second nozzle 42 is closer to the first nozzle 40 in the pair with that second nozzle 42 than to any other first nozzles 40.

Figure 5:
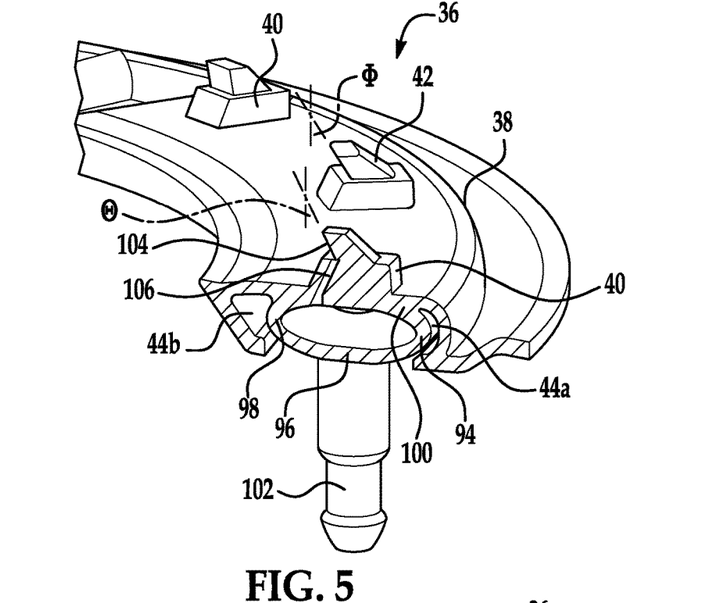
FIG. 5 is a cutaway perspective view of a portion of the ring of FIG. 4.
Figure 7:
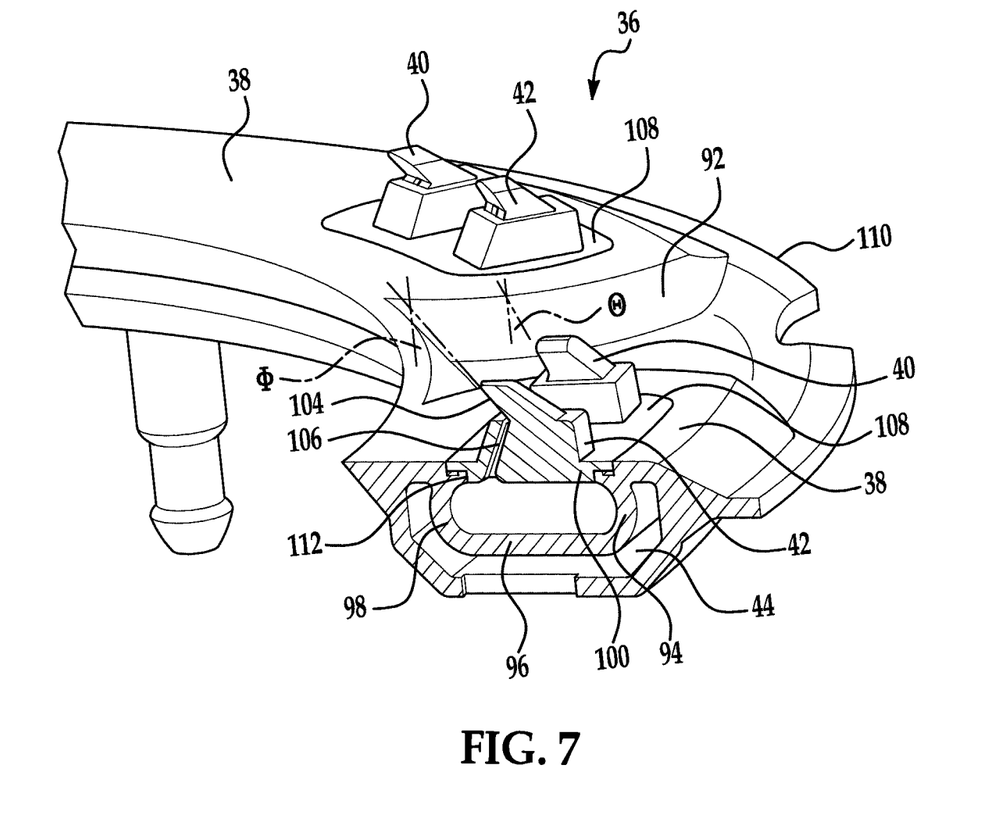
FIG. 7 is a cutaway perspective view of a portion of the ring of FIG. 6.

With reference to FIGS. 5 and 7, the first nozzles 40 and second nozzles 42 are liquid nozzles (i.e. nozzles for dispensing, e.g., spraying, liquid fluid). The first nozzles 40 and second nozzles 42 are shaped to spray fluid in a flat-fan pattern. For the purposes of this disclosure, a "flat-fan pattern" means that the spray has an increasing width in one dimension as the spray moves away from the nozzle 40, 42 and has a generally flat shape along a plane defined by the width and the direction of discharge. The first nozzles 40 and second nozzles 42 each include a deflection surface 104, which is flat, and an outlet 106 from the respective liquid chamber 38 directed at the respective deflection surface 104. Fluid exiting one of the liquid chambers 38 through one of the outlets 106 hits the respective deflection surface 104 and spreads out into the flat-fan pattern defined by the deflection surface 104.

The first nozzles 40 each have a direction of discharge in a radially inward and axial direction, i.e., a direction that is toward the axis A and along the axis A, forming a first angle θ with the axis A. The second nozzles 42 each have a direction of discharge in a radially inward and axial direction forming the second angle φ with the axis A. The directions of discharge of the first nozzles 40 and second nozzles 42 are outside the housing 56 toward the sensor window 34 that is positioned above the housing 56. The second angle φ is different than the first angle θ. The deflection surfaces 104 of the first nozzles 40 each define the first angle θ with the axis A, and the deflection surfaces 104 of the second nozzles 42 each define the second angle φ with the axis A. The different first angle θ and second angle φ provide cleaning coverage along a height of the sensor window 34. The sensor apparatus 32 thus provides good coverage when cleaning the sensor window 34.

With reference to FIGS. 4 and 5, in the first example of the ring 36, the ring 36 is a single piece of material with no internal seams separating multiple pieces, which can locate the liquid chambers 38 respective to each other within tight tolerances, make assembly easier by reducing the number of components of the ring 36 to one, and provide a low chance of leaks because of the lack of seams.

With reference to FIGS. 6 and 7, in the second example of the ring 36, the ring 36 consists of a plurality of insert pieces 108 and a body piece 110. The body piece 110 includes the end walls 92, the radially outer side walls 94, the floors 96, the radially inner side walls 98, and parts of the ceilings 100. The body piece 110 includes a plurality of slots 112, specifically one slot 112 for each insert piece 108, i.e., one slot 112 for each pair of one first nozzle 40 and one second nozzle 42. Each slot 112 is shaped to receive one insert piece 108 inserted into that slot 112. The body piece 110 is a single piece of material with no internal seams separating multiple pieces, which can locate the liquid chambers 38 respective to each other within tight tolerances, make assembly easier by having a small number of components of the ring 36, and provide a low chance of leaks because of the lack of seams.

Each insert piece 108 includes one of the pairs of nozzles 40, 42, i.e., one first nozzle 40 and one second nozzle 42. Each insert piece 108 includes part of one of the ceilings 100. Each insert piece 108 is a single piece of material with no internal seams separating multiple pieces. That the insert pieces 108 are separate from the body piece 110 permits the insert pieces 108 to be made of a different material than the body piece 110. The material chosen for the insert pieces 108 can have different properties than the material chosen for the body piece 110. For example, the material chosen for the insert pieces 108 can be manufacturable to tighter tolerances, and the material chosen for the body piece 110 can be cheaper, which is useful because the nozzles 40, 42 may require tighter tolerances than the rest of the ring 36.

With reference to FIGS. 4-7, the ring 36 includes a plurality of the air chambers 44, specifically at least one air chamber 44 for each liquid chamber 38. Each air chamber 44 is elongated circumferentially around the axis A alongside the respective liquid chamber 38. Each air chamber 44 has a substantially constant cross-section along an arc of circle centered on the axis A from the first end 88 of the respective liquid chamber 38 to the second end 90 of the respective liquid chamber 38. Each air chamber 44 shares at least one of the walls 92, 94, 96, 98, 100 of the respective liquid chamber 38 with that liquid chamber 38. In other words, for each liquid chamber 38, one of the walls 92, 94, 96, 98, 100 of the liquid chamber 38 partially forms that liquid chamber 38 and partially forms the respective air chamber 44. For each liquid chamber 38, at least one air chamber 44 is disposed radially outside that liquid chamber 38 relative to the axis A, and that air chamber 44 can share the radially outer side wall 94 with that liquid chamber 38. Each air chamber 44 lacks inlets and outlets. In other words, the air chambers 44 lack defined flow paths for forcing air into or out of the air chambers 44. The air chamber 44 is filled with air that serves as insulation for the liquid chamber 38. The air chamber 44 can prevent freezing of the liquid in the liquid chamber 38 when the ambient temperature is below freezing.

FIGS. 4-7 show two examples for the arrangement of the air chambers 44 of the ring 36. The arrangements of the air chambers 44 can be interchangeably applied to either example of the ring 36. For example, the air chambers 44 as shown in FIG. 4 can be applied to the ring 36 including the body piece 110 and insert pieces 108 shown in FIG. 6. For another example, the air chambers 44 as shown in FIG. 6 can be applied to the unitary ring 36 shown in FIG. 4.

With reference to FIGS. 4 and 5, in the first example of the ring 36, the ring 36 includes, for each liquid chamber 38, one first air chamber 44a and one second air chamber 44b. Each first air chamber 44a is disposed radially outside the respective liquid chamber 38 relative to the axis A. Each first air chamber 44a shares the respective radially outer side wall 94 with the respective liquid chamber 38; i.e., each radially outer side wall 94 partially forms the respective liquid chamber 38 and partially forms the respective first air chamber 44a. Each second air chamber 44b is disposed radially inside the respective liquid chamber 38 relative to the axis A. Each second air chamber 44b shares the respective radially inner side wall 98 with the respective liquid chamber 38; i.e., each radially inner side wall 98 partially forms the respective liquid chamber 38 and partially forms the respective second air chamber 44b. The first and second air chambers 44a,b are open in a downward direction, closed in an upward direction, and closed in any horizontal directions. The first and second air chambers 44a,b are thus open facing into the housing 56 and closed facing out of the housing 56. That the first and second air chambers 44a,b are open can permit spoke material to be removed after manufacturing the ring 36 using 3D printing, and that the first and second air chambers 44a,b are open facing into the housing 56 provides better insulation than being open in a different direction.

With reference to FIGS. 6 and 7, in the second example of the ring 36, the ring 36 includes, for each liquid chamber 38, one air chamber 44. Each air chamber 44 has a U-shaped cross-section extending circumferentially around the axis A from the first end 88 of the respective liquid chamber 38 to the second end 90 of the respective liquid chamber 38. Each air chamber 44 is disposed radially outside, axially below, and radially inside the respective liquid chamber 38 relative to the axis A. Each air chamber 44 shares the respective radially outer side wall 94, floor 96, and radially inner side wall 98 with the respective liquid chamber 38; i.e., each radially outer side wall 94, floor 96, and radially inner side wall 98 partially form the respective liquid chamber 38 and partially form the respective air chamber 44. The U-shaped cross-section of each air chamber 44 permits that air chamber 44 to insulate the respective liquid chamber 38 on all sides except where doing so would interfere with the nozzles 40, 42.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor apparatus comprising:
a cylindrical sensor window defining an axis; and
a ring fixed relative to the sensor window and centered around the axis;
wherein the ring includes a liquid chamber, at least one nozzle, and an air chamber;
the liquid chamber is elongated circumferentially around the axis;
the at least one nozzle is fluidly connected to the liquid chamber and has a direction of discharge aimed at the sensor window;
the air chamber is elongated circumferentially around the axis alongside the liquid chamber;
the air chamber lacks defined flow paths for forcing air into or out of the air chamber;
the ring includes a wall elongated circumferentially; and
the wall partially forms the liquid chamber and partially forms the air chamber.

2. The sensor apparatus of claim 1, wherein the liquid chamber is one of a plurality of liquid chambers each elongated circumferentially around the axis, the air chamber is one of a plurality of air chambers each elongated circumferentially around the axis alongside one of the liquid chambers, and each air chamber lacks defined flow paths for forcing air into or out of the air chamber.

3. The sensor apparatus of claim 2, wherein the ring includes a plurality of nozzles including the at least one nozzle, and each nozzle is fluidly connected to one of the liquid chambers and has a direction of discharge aimed at the sensor window.

4. The sensor apparatus of claim 3, wherein
the nozzles include at least one first nozzle and at least one second nozzle;
the first nozzles each have a direction of discharge in a radially inward and axial direction forming a first angle with the axis; and
the second nozzles each have a direction of discharge in a radially inward and axial direction forming a second angle with the axis, the second angle being different than the first angle.

5. The sensor apparatus of claim 4, wherein the plurality of nozzles includes at least two first nozzles and at least two second nozzles, and the first nozzles and second nozzles are arranged in an alternating pattern around the ring.

6. The sensor apparatus of claim 5, wherein the nozzles are arranged in pairs of one first nozzle and one second nozzle, and each first nozzle is closer to the second nozzle in the pair than to any other second nozzles.

7. The sensor apparatus of claim 2, wherein each liquid chamber is fluidly isolated from the other liquid chambers.

8. The sensor apparatus of claim 1, wherein the air chamber is disposed radially outside the liquid chamber relative to the axis.

9. The sensor apparatus of claim 8, wherein the air chamber is a first air chamber, the ring includes a second air chamber elongated circumferentially around the axis alongside the liquid chamber, the second air chamber lacks inlets and outlets, and the second air chamber is disposed radially inside the liquid chamber relative to the axis.

10. The sensor apparatus of claim 9, wherein the axis extends vertically, the nozzles are positioned on top of the liquid chamber, and the first air chamber and second air chamber are open in a downward direction.

11. The sensor apparatus of claim 8, wherein the air chamber is disposed below the liquid chamber and radially inside the liquid chamber relative to the axis.

12. The sensor apparatus of claim 11, wherein the liquid chamber is elongated from a first end to a second end, and the air chamber has a U-shaped cross-section extending from the first end to the second end of the liquid chamber.

13. The sensor apparatus of claim 1, further comprising a housing to which the sensor window and the ring are mounted.

14. The sensor apparatus of claim 13, wherein the sensor window extends above the housing, and the direction of discharge of the at least one nozzle is aimed outside the housing.

15. A sensor apparatus comprising:
a cylindrical sensor window defining an axis; and
a ring fixed relative to the sensor window and centered around the axis;
wherein the ring includes a plurality of liquid chambers, a plurality of nozzles, and a plurality of air chambers;
each liquid chamber is elongated circumferentially around the axis;
each nozzle is fluidly connected to one of the liquid chambers and has a direction of discharge aimed at the sensor window;
each air chamber is elongated circumferentially around the axis alongside one of the liquid chambers; and
each air chamber lacks defined flow paths for forcing air into or out of the air chamber;
the nozzles include at least one first nozzle and at least one second nozzle;
the first nozzles each have a direction of discharge in a radially inward and axial direction forming a first angle with the axis; and
the second nozzles each have a direction of discharge in a radially inward and axial direction forming a second angle with the axis, the second angle being different than the first angle.

16. The sensor apparatus of claim 15, wherein the plurality of nozzles includes at least two first nozzles and at least two second nozzles, and the first nozzles and second nozzles are arranged in an alternating pattern around the ring.

17. The sensor apparatus of claim 16, wherein the nozzles are arranged in pairs of one first nozzle and one second nozzle, and each first nozzle is closer to the second nozzle in the pair than to any other second nozzles.

18. The sensor apparatus of claim 17 wherein the ring consists of a plurality of insert pieces and a body piece, each insert piece includes one of the pairs of nozzles, and the body piece is a single piece.

19. The sensor apparatus of claim 15, wherein the first and second nozzles each include a flat deflection surface and an outlet directed at the respective deflection surface.

20. The sensor apparatus of claim 15, wherein the first and second nozzles each include a flat deflection surface, wherein the deflection surfaces of the first nozzles each define the first angle with the axis, and the deflection surfaces of the second nozzles each define the second angle with the axis.

\* \* \* \* \*